United States Patent

[11] 3,540,645

| [72] | Inventors | Dominick J. DeFrancis<br>413 Eastman Road;<br>James M. Fooks, 31 Paschall Road,<br>both of Wilmington, Delaware 19803;<br>Louis Staats, Sr., Rte. 1, Lincoln<br>University, Lincoln University,<br>Pennsylvania 19352 |
|------|-----------|---|
| [21] | Appl. No. | 704,834 |
| [22] | Filed | Feb. 12, 1968 |
| [45] | Patented | Nov. 17, 1970 |

| [54] | APPARATUS FOR STAPLING SHEETS INTO PADS<br>28 Claims, 12 Drawing Figs. |
|------|---|
| [52] | U.S. Cl. ........................ 227/7, 227/100 |
| [51] | Int. Cl. ........................ B27f 7/06 |
| [50] | Field of Search ........................ 227/4, 7, 100; 271/89 |

[56] References Cited

UNITED STATES PATENTS

| 3,248,033 | 4/1966 | DeFrancis et al. | 227/100 |
| 3,265,274 | 8/1966 | Burnell | 227/7 |

*Primary Examiner*—Granville Y. Custer, Jr.
*Attorney*—Munson H. Lane and Munson H. Lane Jr.

ABSTRACT: A holder having a loading station for sheets to be stapled and a two-position stapling station with retractable stop pins at the two stapling positions. A conveyor belt is provided at the bottom of the holder for delivering sheets from the loading to the stapling station and a jogging wheel at the bottom of the loading station jolts the sheets vertically into contact with the conveyor belt which then aligns leading edges of the sheets with the stop pin at the first stapling position. The jogging wheel, stop pins and stapler are electrically actuated in a timed cycle responsive to photoelectric detection of sheets at the loading station.

Patented Nov. 17, 1970

3,540,645

INVENTORS
Dominick J. DeFrancis
James M. Fooks &
Louis T. Staats, Sr.

BY Munson H. Lane
ATTORNEY

Patented Nov. 17, 1970
3,540,645
Sheet 3 of 4
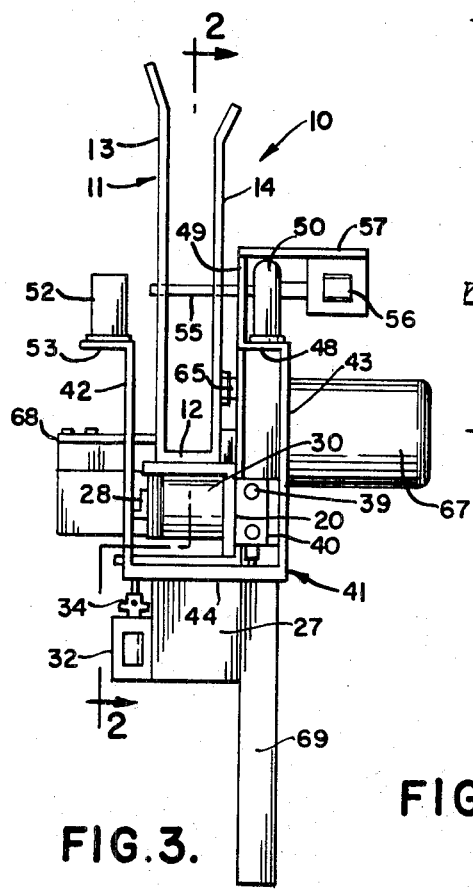
FIG. 3.
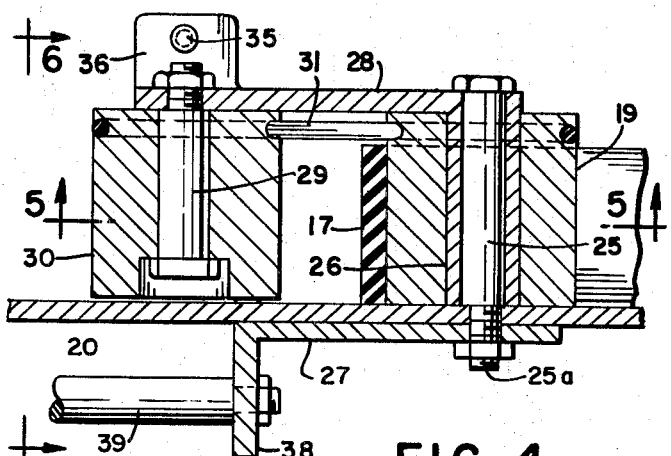
FIG. 4.
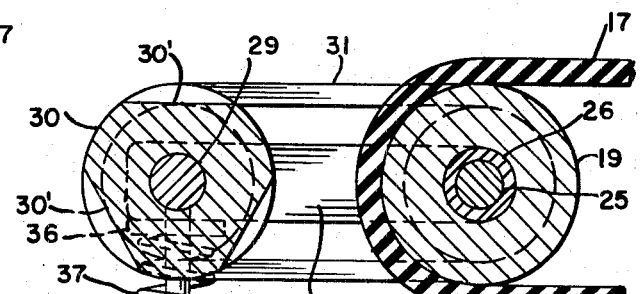
FIG. 5.
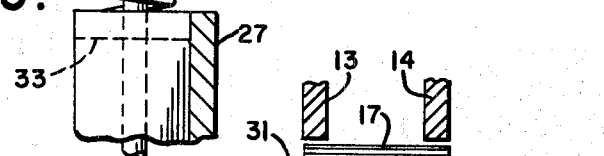
FIG. 6.
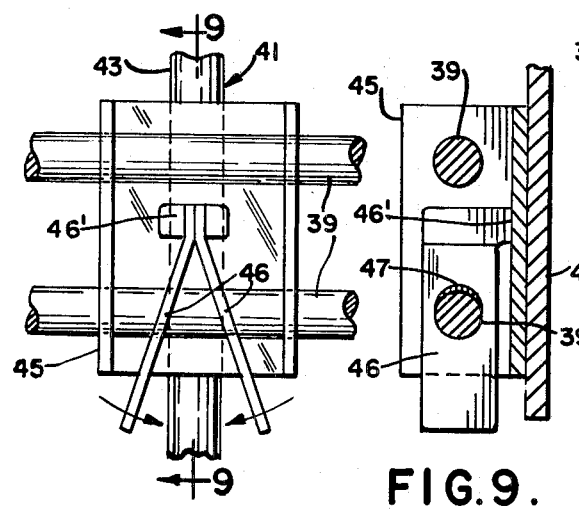
FIG. 8. FIG. 9.
INVENTORS
Dominick J. DeFrancis
James M. Fooks &
Louis T. Staats, Sr.
BY 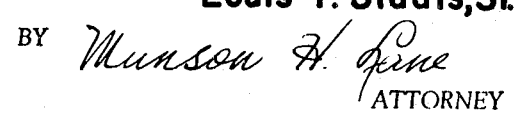
ATTORNEY INVENTORS
Dominick J. DeFrancis
James M. Fooks &
Louis T. Staats, Sr.
BY *Munson H. Lane*
ATTORNEY

APPARATUS FOR STAPLING SHEETS INTO PADS

This invention relates to new and useful improvements in apparatus for stapling sheets into pads, and in particular the invention concerns itself with certain structural and functional improvements in apparatus of this general type disclosed in our U.S. Pat. No. 3,248,033, issued Apr. 26, 1966. Briefly, the apparatus in said patent embodies a troughlike holder having a loading station for receiving a set of juxtaposed sheets, a two-position stapling station, and a conveyor for delivering the juxtaposed sheets from the loading station against stop pins in the stapling station so that the sheets are properly edge-aligned prior to stapling, the conveyor including means for jogging the sheets into an effective conveying contact and edge-alignment at the loading station stop pin.

The principal object of the present invention is to substantially improve the sheet jogging action, this being attained by an improved jogging mechanism located at the bottom of the loading station in advance of the conveyor and including a vertically movable jogging wheel which, in its raised position, imparts vertical jolting to the sheets so that each sheet gravitates into proper contact with the conveyor and is thereby carried against the stapling station stop pin to effect proper alignment of the leading edges of the sheets at the stop pin before stapling thereof is performed.

Another important object of the invention is to provide improved, photoelectric means for detecting insertion of sheets in the loading station and proper alignment thereof at the stop pin of the stapling station, in response to which a timed cycle of operation is initiated for the various electrical components of the machine.

With the foregoing more important objects and features in view and such other objects and features as may become apparent as this specification proceeds, the invention will be understood from the following description taken in conjunction with the accompanying drawings, wherein like characters of reference are used to designate like parts, and wherein:

FIG. 3 is an end view of the apparatus, taken from the loading station end as indicated by the arrow 3 in FIG. 1;

FIG. 4 is an enlarged, fragmentary horizontal sectional view of the improved jogging mechanism;

FIG. 5 is a fragmentary vertical sectional view, taken substantially in the plane of the line 5–5 in FIG. 4;

FIG. 6 is a fragmentary vertical sectional view, taken substantially in the plane of the line 6–6 in FIG. 4;

FIG. 7 is an end view of a supporting yoke for the photoelectric detecting means;

FIG. 8 is an enlarged, fragmentary elevational view showing the back of the slide of the supporting yoke;

FIG. 9 is a fragmentary vertical sectional view, taken substantially in the plane of the line 9–9 in FIG. 8;

FIG. 10 is a vertical sectional view, taken substantially in the plane of the line 10–10 in FIG. 1;

FIG. 11 is an enlarged elevational view showing a modified form of the jogging wheel.

Figure 1:
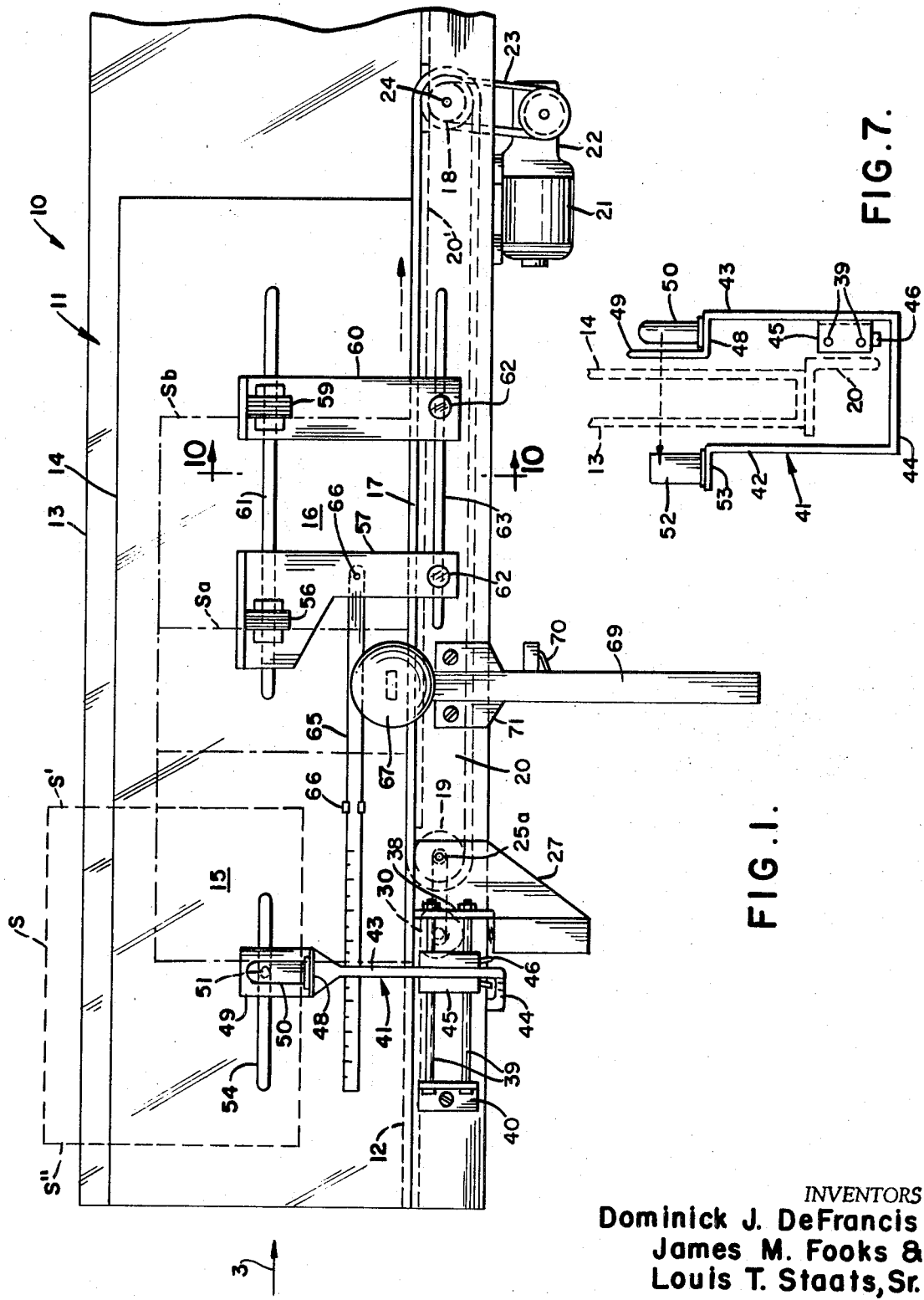
FIG. 1 is a front elevational view of the stapling apparatus of the invention.

Referring now to the accompanying drawings in detail, the stapling apparatus is designated generally by the reference numeral 10 and, from the standpoint of general construction, is quite similar to that disclosed in our aforementioned U.S. Pat. No. 3,248,033. As such, the apparatus comprises a horizontally elongated troughlike holder 11 including a pair of relatively high, closely spaced walls 13, 14, the holder being relatively deep and narrow and open at the top and both ends thereof. One end portion of the holder 11 constitutes a loading station 15 into which may be deposited a set of juxtaposed sheets S to be stapled, and downstream from the loading station is a stapling station 16 having two successive stapling positions, the location of the sheets in these positions being indicated at Sa and Sb, respectively.

Figure 2:
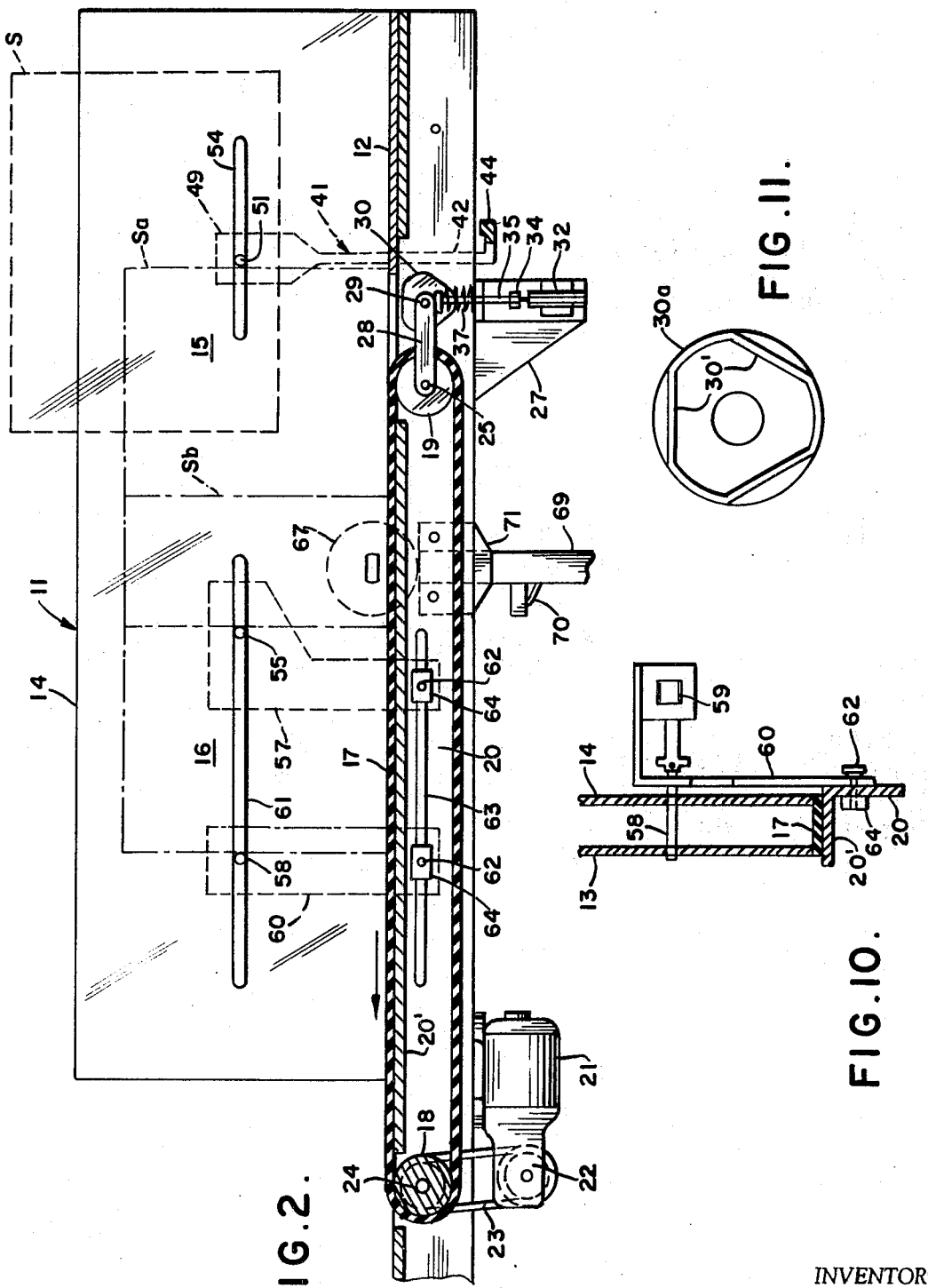
FIG. 2 is a longitudinal, vertical sectional view thereof, looking forwardly substantially from the plane of the line 2–2 in FIG. 3.

At the loading station 15 the lower edges of the walls 13, 14 are connected together by a bottom wall 12, but beyond that the bottom of the holder 11 is constituted by the upper run of an endless conveyor belt 17 which passes around a drive pulley 18 and an idler pulley 19. A supporting rail 20 of an inverted L-shaped cross section underlies the holder 11, the horizontal flange 20' of this rail underlying the upper run of the conveyor belt and being appropriately recessed to afford clearance for the pulleys 18, 19, as is best shown in FIG. 2. The holder 11 is mounted on the rail 20 in a suitable manner so that the lower edges of the holder walls 13, 14 are spaced above the rail flange 20' only sufficiently to accommodate the upper run of the belt 17, as will be apparent from FIG. 6. The bottom wall 12 of the holder 11 is substantially coplanar with the upper run of the belt, as in FIG. 2.

A suitably mounted electric motor 21, equipped with a reduction gear box 22, is operatively connected to the conveyor drive pulley 18, as by an endless belt drive 23. The pulley 18 is carried by a stub shaft 24 on the vertical flange of the rail 20. The idler pulley 19 is similarly carried by a stub shaft 25 which, as is best shown in FIGS. 4 and 5, passes through a tubular bushing 26 inside the roller 19 and has a nut-equipped, screw-threaded end portion 25a secured in an aperture in the vertical flange of the rail 20, the portion 25a also serving to hold in place a bracket 27 hereinafter described. While the shaft 25 is stationary, the bushing 26 is rotatable thereon and the pulley 19 is rotatable on the bushing.

One end of the bushing 26 is provided with an integral arm 28, the free end portion of which carries a stub shaft 29 on which is rotatably mounted a jogging wheel or roller 30, it being apparent that the rotatable positioning of the bushing 26 on the shaft 25 permits the arm 28 to swing in a vertical plane, so as to raise or lower the jogging wheel.

As will be apparent from FIGS. 4 and 5, the pulley 19 and the jogging wheel 30 are circumferentially grooved to receive an endless drive belt 31 whereby the jogging wheel is rotated when the conveyor belt 17 is driven by the motor 21. The jogging wheel 30 is provided with a plurality of flat faces 30' so that when the jogging wheel is raised by the arm 28, the flat faces 30' and the arcuate portions of the wheel between such flat faces alternately engage lower edges of the sheets S in the loading station 15 and a vertical jolting movement is imparted to the sheets, causing each sheet to gravitate into proper contact of its lower edge with the conveyor belt 17 so that the sheets may be effectively conveyed by the belt to the stapling station 16.

The raising and lowering movement of the jogging wheel is effected by mechanism including a solenoid 32 which is mounted on the aforementioned bracket 27, it being noted that the bracket is angulated and offset to extend under the rail 20 and support the solenoid 32 at a position below a laterally projecting lug 33 provided on the bracket 27. The armature 34 of the solenoid 32 is connected to a rod 35 which passes slidably through the lug 33 and is connected to a laterally projecting lug 36 on the arm 28, a compression spring 37 being interposed between the lugs 33, 36 so as to bias the jogging wheel 30 to its raised position. However, when the solenoid 32 is energized, the wheel 30 is drawn downwardly against the action of the spring 37, it being noted that in the lowered position, the top of the jogging wheel is somewhat below the level of the upper run of the conveyor belt 17, as shown in FIG. 2.

The bracket 27 is also provided with a forwardly projecting flange 38, providing support for one end of a pair of vertically spaced horizontal rods 39, disposed in parallel to the rail 20. Support for the other end of these rods is provided by a bracket 40 which is secured to the rail 20 as is best shown in FIG. 1. A supporting yoke 41 for a hereinafter described photoelectric detection means is adjustably positioned on the rods, the yoke being best shown in FIG. 7 and including a pair of transversely spaced upright arms 42, 43 and a connecting bight portion 44. The yoke 41 straddles the holder 11 with its arms 42, 43 disposed exteriorly of the respective walls 13, 14 and with its bight portion 44 extending below the rail 20. A slide 45 in the form of a U-shaped bracket is secured to the yoke arm 43 and is slidable longitudinally on the rods 39, whereby the entire yoke 41 may be slid longitudinally with respect to the holder 11. Means are provided for releasably locking the yoke in an adjusted position, these means comprising a pair of straps 46 which are secured at one end thereof inside the slide 45 as at 46' and extend downwardly in divergent relation, these straps being provided with apertures 47 to receive one of the rods 39. The straps are resilient and are biased by their resiliency to the divergent position as shown in FIG. 8, wherein they frictionally grip the associated rod 39 in their apertures 47. However, by pressing the lower end portions of the straps together, the frictional grip of the straps on the rod is relieved and the yoke may then be slid along the rods 39 as desired. Other suitable releasably locking means may be provided.

The upper end of the yoke arm 43 is provided with a platform 48 and with an upstanding shield 49. A photocell energizing lamp 50 is mounted on the platform 49 and the shield 49 is formed with an aperture 51 (see FIGS. 1 and 2) through which a light beam from the lamp 50 is projected transversely of the holder 11 to a photoconductive type photorelay 52 mounted on a platform 53 at the upper end of the yoke arm 42, as will be apparent from FIG. 7. To facilitate projection of the light beam transversely of the holder, the holder walls 13, 14 are provided with longitudinal slots 54 in register with the aperture 51 in the shield 49, it being noted that these slots enable the light beam to be projected regardless of the longitudinal adjustment of the yoke 41 relative to the holder, as already described. The yoke 41 with the photoelectric means 50, 52 is located in the region of the holder which constitutes the loading station 15, so that when the sheets S are inserted into the loading station, they interrupt the passage of light from the lamp 50 to the photorelay 52.

The stapling station 16 in the holder 11 has two positions for stapling the sheets, as at Sa and Sb. In the position Sa the sheets are delivered by the conveyor belt 17 against a retractable stop pin 55 actuated by a solenoid 56 which is mounted on a bracket 57. Similarly, in the second position Sb the sheets are delivered against a stop pin 58 actuated by a solenoid 59 mounted on a bracket 60. The pins 55, 58 are projectable and retractable through longitudinal slots 61 formed in the holder walls 13 and 14, the brackets 57, 60 being disposed exteriorly of the wall 14 and having their lower end portions adjustably secured to the rail 20 by suitable screws 62 which pass through a longitudinal slot 63 in the rail into screw-threaded blocks 64, as will be apparent from FIGS. 2 and 10. By virtue of this arrangement the brackets 57, 60 may be moved closer together or further apart so as to accordingly vary the distance between the two stapling positions, that is to say, the distance between two staples applied to the sheets at the two stapling positions. Moreover, by adjusting the bracket 57 toward or away from the sheet detecting means 50, 52, it is possible to accommodate sheets of different lengths, and for this purpose a dimensionally graduated scale bar 65 is connected at one end thereof to the bracket 57 and extends longitudinally along the outside of the holder wall 14 past the yoke arm 43, whereby position of the arm 43 with respect to graduations on the scale bar 65 may indicate the distance of the detecting means 50, 52 from the first stop pin 55, such distance being adjustable as aforesaid to suit sheets of various lengths and for varying the suitable guides 66 provided on the wall 14, as will be apparent from FIG. 1.

The stapling operation itself is accomplished successively at the two stapling stations by a solenoid actuated stapler 67 cooperating with a solenoid actuated, projectable and retractable anvil 68, these components being arranged substantially the same as in our aforementioned U.S. Pat. No. 3,248,033 so that a detailed explanation thereof herein is not necessary. However, it may be noted that the stapler 67 includes a staple magazine 69 having a switch 70 which is actuated when the supply of staples in the magazine is exhausted, or nearly so, the stapler with its magazine being mounted on the rail 20 by a suitable bracket 71.

Figure 12:
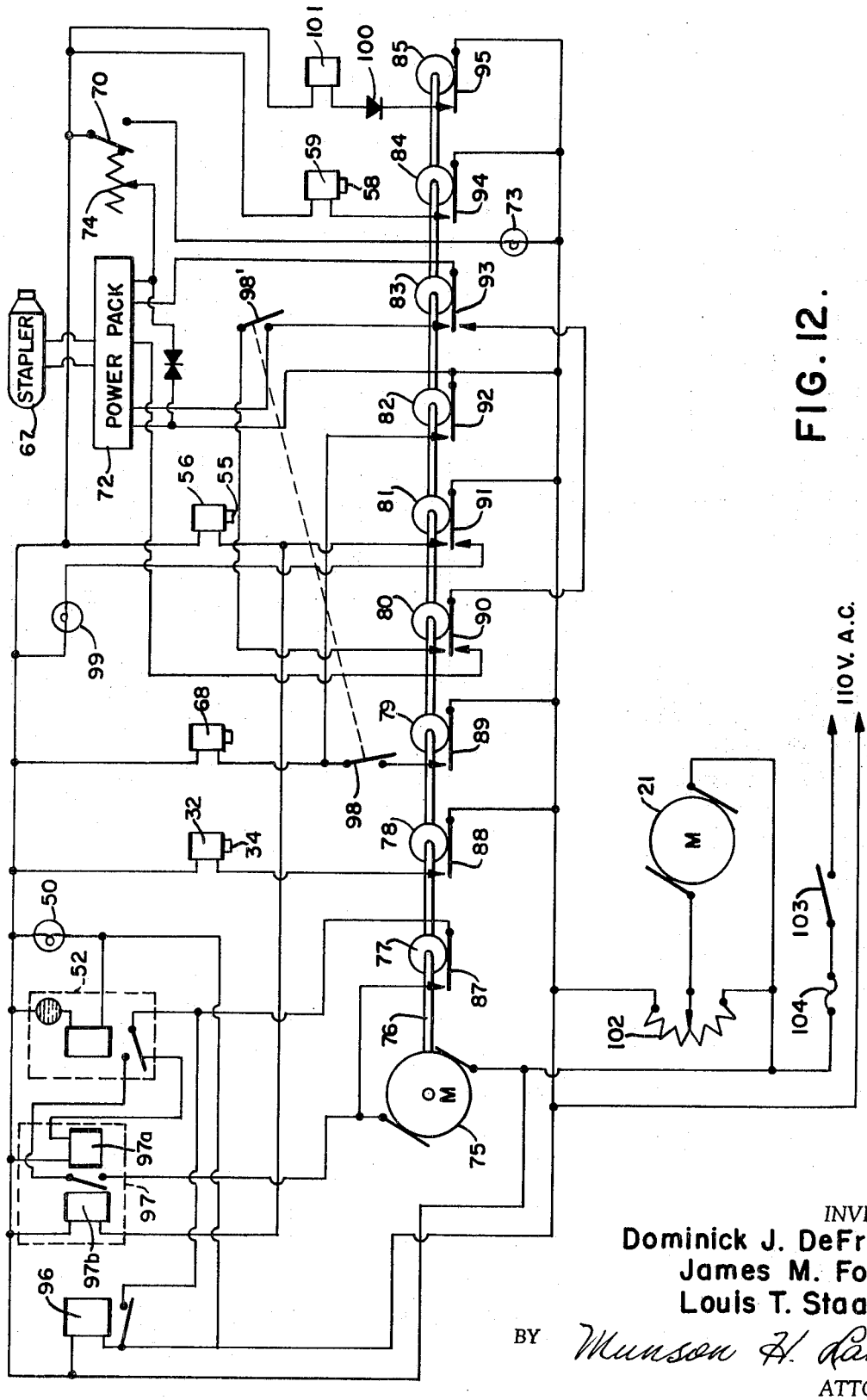
FIG. 12 is a wiring diagram of the electrical components of the invention.

The operation of the various electrical components of the apparatus is controlled in a coordinated, cyclic manner by means shown diagramatically in FIG. 12, wherein it will be noted that the stapler 67 is energized by a suitable power pack 72. The magazine switch 70 preferably is double sided, having a normally open side in circuit with a warning light 73 and a normally closed side in circuit with the power pack 72 through a resistor 74, so that when the supply of staples in the magazine 69 is exhausted, the warning light 73 is energized and the supply of current to the power pack 72 is interrupted. The resistor 74 is used to vary the driving force of stapler to adjust for varying thicknesses of material being stapled.

The electric control also includes a timer having a motor 75 which drives a shaft 76 carrying a plurality of cams 77, 78, 79, 80, 81, 82, 83, 84 and 85, actuating switches 87, 88, 89, 90, 91, 92, 93, 94 and 95, respectively.

The switch 87 is the timer homing switch which is in circuit with the photorelay 52 and with a time delay relay 96, whereby the timer is prevented from creeping before the light source 50 reaches adequate brilliance to activate the photorelay 52 when power is turned on. Also, a latching relay 97 is provided in circuit with the photorelay 52 and switch 87 so as to override the homing switch 87 under certain conditions, hereinafter mentioned.

The switch 88 is in series with the solenoid 32 which lowers the jogging wheel 30, the jogging wheel otherwise being biased to its raised position by the spring 37. The switch 89 is in series with the solenoid actuated stapling anvil 68 to energize the same at the first stapling position, while at the second stapling position the anvil is energized through the switch 92. The switch 90 energizes the power pack 72 to actuate the stapler 67 at the first stapling position, and at the second stapling position the power pack is energized through the switch 93. Selector switch means 98, 98' are in series with the switches 89 and 93 so that a staple may be driven either at both the first and second stapling positions, or at the second stapling position only.

The switch 91 is in series with the solenoid 56 which actuates the first stop pin 55 and is also in series with a feed signal lamp 99 to energize the signal lamp when the stop pin 55 is projected. The solenoid 59 actuating the second stop pin 58 is energized through the switch 94.

The switch 95 is connected through a half wave rectifier 100 to a vibrator coil 101 which is attached to a stapled pad stacking apparatus (not shown herein) for vibrating the stacker each cycle to improve uniformity of descent of the stack.

The speed of the conveyor belt driving motor 21 is controlled by an autotransformer 102, while 103 indicates a master switch in the power supply line, in series with a fuse 104.

In operation, the master switch 103 is closed and the motor 21 is thus energized to drive the conveyor belt 17 in a continuous manner. A plurality of sheets S to be stapled are then inserted downwardly into the loading station 15 in the holder 11, so that they come in contact with the conveyor belt and with the jogging wheel 30, the latter at this point being raised by the spring 37 and being rotated by the drive 31 from the conveyor belt.

The vertical jolting action imparted to the sheets by the jogging wheel will cause them to become properly seated on the conveyor belt and delivered by the belt to the first stapling position Sa in the stapling station 16, where the leading edges of the sheets will become properly aligned against the first stop pin 55 with their lower edges aligned against the belt.

As the sheets are inserted in the loading station 15, the light beam from the lamp 50 to the photorelay 52 will be interrupted, thus deenergizing the photorelay and closing its contacts to energize the latch coil 97a of the latching relay 97 and closing its contacts. As jogging of the sheets continues and their leading edges become aligned against the stop pin 55, the sheets will have moved forwardly to the position Sa wherein their trailing edges no longer interrupt the light beam from the lamp 50 and the photorelay 52 will thus be energized to open the circuit to the latching coil 97a, whereby to close the circuit through the latching relay contacts to energize the timer motor 75 which rotates the shaft 76 with the several cams 77—85 thereon for sequentially actuating the switches 87—95. First, the switch 87 will be closed to keep the timer motor 75 running throughout the entire cycle. Next, the switch 88 will be closed to energize the solenoid 32 for lowering the jogging wheel 30 out of engagement with the sheets which have been aligned against the first stapling position stop pin 55 as at Sa.

The switch 89 will then close to project the anvil 68 against the sheets, whereupon closing of the switch 90 will actuate the stapler 67 to apply the first staple to the sheets at the first stapling position. The switches 89 and 90 are then opened, permitting the anvil to be retracted and the stapler power pack 72 to be recharged. The switch 88 will also be opened to deenergize the solenoid 32 and permit raising of the jogging wheel 30 by the spring 37.

As rotation of the shaft 76 continues, the cam 81 actuates the switch 91 to energize the solenoid 56 and the unlatch coil 97b of the latching relay 97, thus retracting the first stop pin 55 and opening the contacts of the latching relay. It will be noted that the latching relay 97 is capable of overriding the homing switch 87 when a second set of sheets is inserted into the loading station and has become aligned so as not to intercept the photorelay light beam before the timer has completed its cycle. With actuation of the switch 91 the signal lamp 99 will indicate to the operator of the machine that the first stop pin 55 has been projected and a second set of sheets may be inserted into the loading station.

When the stapling operation at the first station has been performed, retraction of the stop pin 55 permits the stapled sheets to be conveyed by the belt 17 to the second stapling position Sb where the sheets come in abutment with the second stop pin 58. The cam 82 then closes the switch 92 to again bring the anvil 68 against the sheets, and closing of the switch 93 actuates the stapler 67 for the second time to staple the sheets in the second position. The switches 92, 93 are then opened to retract the anvil 68 and permit recharging of the power pack 72. The switch 94 is then closed by the cam 84 to retract the second stop pin 58 by the solenoid 59, so that the completed pad of sheets, stapled in two positions, may be discharged from the machine by the conveyor belt 17, as to a pad stacking device, wherein the stacking operation is facilitated by the vibrating coil 101 energized through closing of the switch 95.

Further rotation of the shaft 76 opens the switch 91 to return the first stop pin 55 to its projected position and energize the feed signal lamp 99, and opening of the switch 94 will then return the second stop pin 58 to its projected position. In the final phase of the operational cycle the switch 87 is opened by the cam 77, thus discontinuing the supply of current to the timer motor 75.

It has been found that the jogging and alignment of sheets against the stop pin 55 is substantially improved if the circumference of the jogging wheel 30, including the flat faces 30', is covered by a layer of suitable resilient material as indicated at 30a in FIG. 11, so that the friction between the jogging wheel and the sheets is increased.

While in the foregoing there has been shown and described the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

We claim:

1. In an apparatus for stapling sheets into pads, the combination of a holder having a loading station and a stapling station therein, said holder including a pair of horizontally spaced upright walls open at the top of the holder to receive a set of juxtaposed sheets in a substantially vertical position therebetween, an endless conveyor provided at the bottom of said holder for supporting bottom edges of said set of sheets and delivering the set of sheets from said loading station to said stapling station, movable stop means disposed at said stapling station in said holder and normally positioned across the path of travel of said set of sheets, jogging means provided at the bottom of said loading station in said holder in advance of said conveyor, said jogging means being operative for vertically jolting said set of sheets to frictionally engage lower edges of the individual sheets in the set with said conveyor and to align leading edges of the individual sheets against said stop means, means at the stapling station for stapling together the individual sheets in the set, and means for withdrawing said stop means from across the path of travel of said sheets to permit further delivery of the stapled sheets by said conveyor.

2. The apparatus as defined in claim 1 together with means for raising and lowering said jogging means relative to said holder respectively into and out of operative engagement with the sheets in said loading station.

3. The apparatus as defined in claim 1 wherein said jogging means includes a rotatable jogging wheel, and drive means from said conveyor for rotating said wheel.

4. The apparatus as defined in claim 1 wherein said conveyor includes an endless belt, an end pulley having said belt passing around the same, said jogging means including a vertically swingable arm having a fulcrum at one end thereof coaxial with said pulley and extending longitudinally therefrom in advance of the conveyor belt, a rotatable jogging wheel mounted at the other end of said arm, means drivingly connecting said jogging wheel to said pulley, and means for raising and lowering said arm for respectively moving the jogging wheel into and out of engagement with sheets in said loading station.

5. The apparatus as defined in claim 1 wherein said stapling means and said means for withdrawing said stop means are electrically actuated, together with an electric timer switch for sequentially coordinating the operation of said stapling means and withdrawing means, and detecting means responsive to presence of sheets in the loading station and to proper edge alignment of the sheets at the stop means for actuating said timer switch.

6. The apparatus as defined in claim 5 wherein said detecting means include a photorelay and a lamp projecting a beam of light to said photorelay transversely of the loading station in said holder, said photorelay being in circuit with said timer switch for actuating the same when sheets properly aligned against said stop means do not interrupt the light beam from said lamp.

7. The apparatus as defined in claim 6 together with means for adjusting the distance between said detecting means and said stop means longitudinally of said holder.

8. The apparatus as defined in claim 5 together with electrically actuated means for raising and lowering said jogging means relative to said holder respectively into and out of operative engagement with sheets in said loading station, said timer switch also sequentially coordinating the operation of said raising and lowering means with said stapling means and said withdrawing means.

9. The apparatus as defined in claim 1 wherein said stapling station in said holder has first and second stapling positions spaced longitudinally along the running length of said conveyor, said stop means comprising first and second stop pins projectable into the holder for abutment by sheets at the respective first and second stapling positions, and means for adjusting the distance between said first and second stop pins longitudinally of the holder.

10. The apparatus as defined in claim 1 wherein said jogging means comprises a rotatable jogging wheel having flat faces on its periphery, and a layer of resilient material covering the periphery of said wheel for frictional engagement thereof with sheets to be jogged.

11. The apparatus as defined in claim 7 together with a graduated scale means extending longitudinally of said holder for indicating the distance of said detecting means from said movable stop means.

12. The apparatus as defined in claim 11 wherein said means for adjusting the distance between said detecting means and said stop means longitudinally of said holder includes elongated support means extending outside of said holder and longitudinally of said loading station, a support bracket for said detector adjustably mounted on said elongated support means to vary the distance of said detector from said movable stop means in accordance with the lengths of sheets being operated on, said support bracket having a straight edge crossing said graduated scale at right angles thereto and cooperating with said graduated scale to indicate the distance of said detector means from said movable stop means.

13. The apparatus as defined in claim 12 wherein said elongated support means includes a pair of spaced, parallel rods and said support bracket includes a slide portion slidably mounted on said parallel rods, and a friction latch means secured to said slide portion for frictionally engaging one of said rods, said latch means being resiliently biased into engagement with one of said rods and having operating means for releasing said latch means from frictional engagement with said one of said rods.

14. The apparatus as defined in claim 12 wherein said bracket is a U-shaped yoke having a pair of upright portions extending transversely along the outsides of the opposite upright walls of said holder and a bend portion which connects the upright portion and extends beneath the bottom of said holder, said photorelay being mounted on one of said upright portions and said lamp being mounted on the other of said portions.

15. The apparatus set forth in claim 11 wherein said movable stop means is mounted for longitudinal adjustment relative to said holder, and said graduated scale is connected to said movable stop means and is movably mounted on the outside of said holder to move simultaneously with said movable stop means in longitudinal adjustment thereof.

16. The apparatus set forth in claim 11 wherein one of the upright walls of said holder has an elongated longitudinal slot therein, and said movable stop means is mounted outside of said holder upright wall and includes a projectable and retractable pin which is movable through said elongated longitudinal slot in its various positions of longitudinal adjustment.

17. In an apparatus for stapling sheets into pads, the combination of a holder having a loading station and a stapling station therein, said holder including a pair of horizontally spaced upright walls open at the top of the holder to receive a set of juxtaposed sheets in a substantially vertical position therebetween, an endless conveyor provided at the bottom of said holder for supporting bottom edges of said set of sheets and delivering the set of sheets from said loading station to said stapling station, movable stop means disposed at said stapling station in said holder and normally positioned across the path of travel of said set of sheets, means at the stapling station for stapling together the individual sheets in the set, while said sheets are held against forward travel by said stop means, means for withdrawing said stop means from across the path of travel of said sheets to permit further delivery of the stapled sheets by said conveyor, means for sequentially coordinating the operation of said stapling means and withdrawing means, and detecting means responsive to the presence of sheets in the loading station and to the proper edge alignment of the sheets at the stop means for actuating said means for sequentially coordinating the operation of said stapling means and withdrawing means, and means for adjusting the distance between said detecting means and said stop means longitudinally of said holder, said stapling means being interposed between said detecting means and said stop means.

18. The apparatus as defined in claim 17 together with a graduated scale means extending longitudinally of said holder for indicating the distance of said detecting means from said movable stop means.

19. The apparatus as defined in claim 18 wherein said means for adjusting the distance between said detecting means and said stop means longitudinally of said holder includes elongated support means extending outside of said holder and longitudinally of said loading station, a support bracket for said detector adjustably mounted on said elongated support means to vary the distance of said detector from said movable stop means in accordance with the lengths of sheets being operated on, said support bracket having a straight edge crossing said graduated scale at right angles thereto and cooperating with said graduated scale to indicate the distance of said detector means from said movable stop means.

20. The apparatus as defined in claim 19 wherein said elongated support means includes a pair of spaced, parallel rods and said support bracket includes a slide portion slidably mounted on said parallel rods, and a friction latch means secured to said slide portion for frictionally engaging one of said rods, said latch means being resiliently biased into engagement with one of said rods and having operating means for releasing said latch means from frictional engagement with said one of said rods.

21. The apparatus as defined in claim 19 wherein said bracket is a U-shaped yoke having a pair of upright portions extending transversely along the outsides of the opposite upright walls of said holder and a bend portion which connects the upright portion and extends beneath the bottom of said holder, said detecting means including a photorelay and a lamp projecting a beam of light to said photorelay transversely of the loading station in said holder, said photorelay being mounted on one of said upright portions and said lamp being mounted on the other of said portions.

22. The apparatus set forth in claim 18 wherein said movable stop means is mounted for longitudinal adjustment relative to said holder, and said graduated scale is connected to said movable stop means and is movably mounted on the outside of said holder to move simultaneously with said movable stop means in longitudinal adjustment thereof.

23. The apparatus set forth in claim 17 wherein said upright walls of said holder have parallel, elongated, longitudinal slots therein, and said movable stop means is adjustably mounted outside of one of said upright walls and includes a projectable and retractable pin which is movable through said elongated longitudinal slots in the various positions of longitudinal adjustment of said movable stop means.

24. In an apparatus for aligning a set of juxtaposed sheets comprising a holder including a bottom, and a pair of horizontally spaced upright walls open at the top of the holder to receive a set of juxtaposed sheets in a substantially vertical position, said holder having a loading station and an aligning station, movable stop means disposed at said aligning station in said holder and normally positioned transversely thereof between said walls, an endless conveyor provided at the bottom of said holder for supporting the bottom edges of said set of sheets and delivering the set of sheets from said loading station to said aligning station, jogging means provided at the bottom of said holder in advance of said conveyor, said jogging means being operative for vertically jolting said set of sheets to frictionally engage lower edges of the individual sheets in the set with said conveyor, and to align leading edges of the individual sheets against said stop means.

25. The apparatus as defined in claim 24 together with means for raising and lowering said jogging means relative to said holder respectively into and out of operative engagement with the sheets in said loading station.

26. The apparatus as defined in claim 24 wherein said jogging means includes a rotatable jogging wheel, and drive means from said conveyor for rotating said wheel.

27. The apparatus as defined in claim 24 wherein said conveyor includes an endless belt, an end pulley having said belt passing around the same, said jogging means including a vertically swingable arm having a fulcrum at one end thereof coaxial with said pulley and extending longitudinally therefrom in advance of the conveyor belt, a rotatable jogging wheel mounted at the other end of said arm, means drivingly connecting said jogging wheel to said pulley, and means for raising and lowering said arm for respectively moving the jogging wheel into and out of engagement with sheets in said loading station.

28. The apparatus as set forth in claim 24 together with means for withdrawing said stop means from across the path of travel of said sheets to permit further delivery of said sheets by said conveyor.